US011142039B2

(12) United States Patent
Rakshit et al.

(10) Patent No.: US 11,142,039 B2
(45) Date of Patent: Oct. 12, 2021

(54) IN-VEHICLE ADJUSTMENT TO DESTINATION ENVIRONMENTAL CONDITIONS

(71) Applicant: INTERNATIONAL BUSINESS MACHINES CORPORATION, Armonk, NY (US)

(72) Inventors: Sarbajit K. Rakshit, Kolkata (IN); Craig M. Trim, Ventura, CA (US); Shikhar Kwatra, Durham, NC (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 16/282,276

(22) Filed: Feb. 21, 2019

(65) Prior Publication Data

US 2020/0269653 A1  Aug. 27, 2020

(51) Int. Cl.
*B60H 1/00* (2006.01)
*G06K 9/00* (2006.01)
(Continued)

(52) U.S. Cl.
CPC ..... *B60H 1/00771* (2013.01); *B60H 1/00742* (2013.01); *B60W 40/08* (2013.01);
(Continued)

(58) Field of Classification Search
CPC ............ B60H 1/00771; B60H 1/00742; G06K 9/00832; G01C 21/3691; B60W 40/08; B60W 2040/0872
See application file for complete search history.

(56) References Cited

U.S. PATENT DOCUMENTS 8,457,827 B1  6/2013  Ferguson et al.
8,626,847 B2  1/2014  Jones
(Continued)

FOREIGN PATENT DOCUMENTS

CN  106064553 A  11/2016
CN  106515362 A  3/2017
(Continued)

OTHER PUBLICATIONS

English Translation of DE-102013003709-A1.*
(Continued)

*Primary Examiner* — Nicholas K Wiltey
*Assistant Examiner* — Gabriel J Lambert
(74) *Attorney, Agent, or Firm* — Elliot J. Shine

(57) ABSTRACT

A method, computer system, and a computer program product for adjusting a plurality of environmental conditions of a vehicle based on a plurality of environmental conditions of an expected destination is provided. The present invention may include monitoring the plurality of environmental conditions of a vehicle by utilizing at least one vehicle device sensor. The present invention may then include retrieving the plurality of environmental conditions of an expected destination of the vehicle. The present invention may also include determining a delta between the monitored plurality of environmental conditions of the vehicle and the retrieved plurality of environmental conditions of the expected destination of the vehicle. The present invention may further include adjusting, over a gradual period of time, the monitored plurality of environmental conditions of the vehicle.

17 Claims, 7 Drawing Sheets

(51) Int. Cl.
  G01C 21/36 (2006.01)
  B60W 40/08 (2012.01)

(52) U.S. Cl.
  CPC ..... G01C 21/3691 (2013.01); G06K 9/00832 (2013.01); *B60W 2040/0872* (2013.01)

(56) References Cited

U.S. PATENT DOCUMENTS

| | | | |
|---|---|---|---|
| 8,781,669 B1 | 7/2014 | Teller et al. | |
| 9,682,609 B1* | 6/2017 | Dudar | B60H 1/00785 |
| 9,774,746 B1 | 9/2017 | Sennett | |
| 9,919,712 B1* | 3/2018 | Doyen | G16H 40/67 |
| 2008/0306656 A1* | 12/2008 | Baumann | B60R 21/01552 |
| | | | 701/45 |
| 2011/0084824 A1* | 4/2011 | Tewari | B60R 16/0232 |
| | | | 340/438 |
| 2014/0309885 A1* | 10/2014 | Ricci | A61B 5/742 |
| | | | 701/41 |
| 2016/0090097 A1* | 3/2016 | Grube | A61B 5/18 |
| | | | 340/576 |
| 2016/0094355 A1 | 3/2016 | Waltermann | |
| 2016/0107509 A1* | 4/2016 | Kirsch | B60H 1/00771 |
| | | | 165/202 |
| 2017/0095670 A1* | 4/2017 | Ghaffari | A61N 1/36071 |
| 2017/0126810 A1 | 5/2017 | Kentley et al. | |
| 2017/0247000 A1* | 8/2017 | Ricci | B60R 16/037 |
| 2017/0330044 A1* | 11/2017 | Telpaz | B60K 35/00 |
| 2017/0334263 A1* | 11/2017 | Schumacher | B60H 1/00892 |
| 2018/0072133 A1* | 3/2018 | Yamanaka | B60H 1/00742 |
| 2018/0101146 A1* | 4/2018 | Hariharan | G05B 13/0265 |
| 2018/0203443 A1* | 7/2018 | Newman | B60L 1/00 |
| 2018/0218470 A1* | 8/2018 | Belwafa | G06Q 50/30 |
| 2018/0251122 A1* | 9/2018 | Golston | B60W 40/02 |
| 2018/0348740 A1* | 12/2018 | Rocci | G16B 99/00 |
| 2019/0225232 A1* | 7/2019 | Blau | B60W 50/0098 |
| 2020/0062078 A1* | 2/2020 | Obert | B60H 1/00971 |
| 2020/0079396 A1* | 3/2020 | Beaurepaire | B60W 40/09 |
| 2020/0172034 A1* | 6/2020 | Rowe | B60H 1/00657 |
| 2020/0194115 A1* | 6/2020 | Chou | A61B 5/0035 |

FOREIGN PATENT DOCUMENTS

| | | | | |
|---|---|---|---|---|
| DE | 102013003709 A1 * | 9/2014 | ........ | B60H 1/00771 |
| GN | 104802611 A | 7/2015 | | |

OTHER PUBLICATIONS

Mell et al., "The NIST Definition of Cloud Computing," National Institute of Standards and Technology, Sep. 2011, p. 1-3, Special Publication 800-145.

* cited by examiner

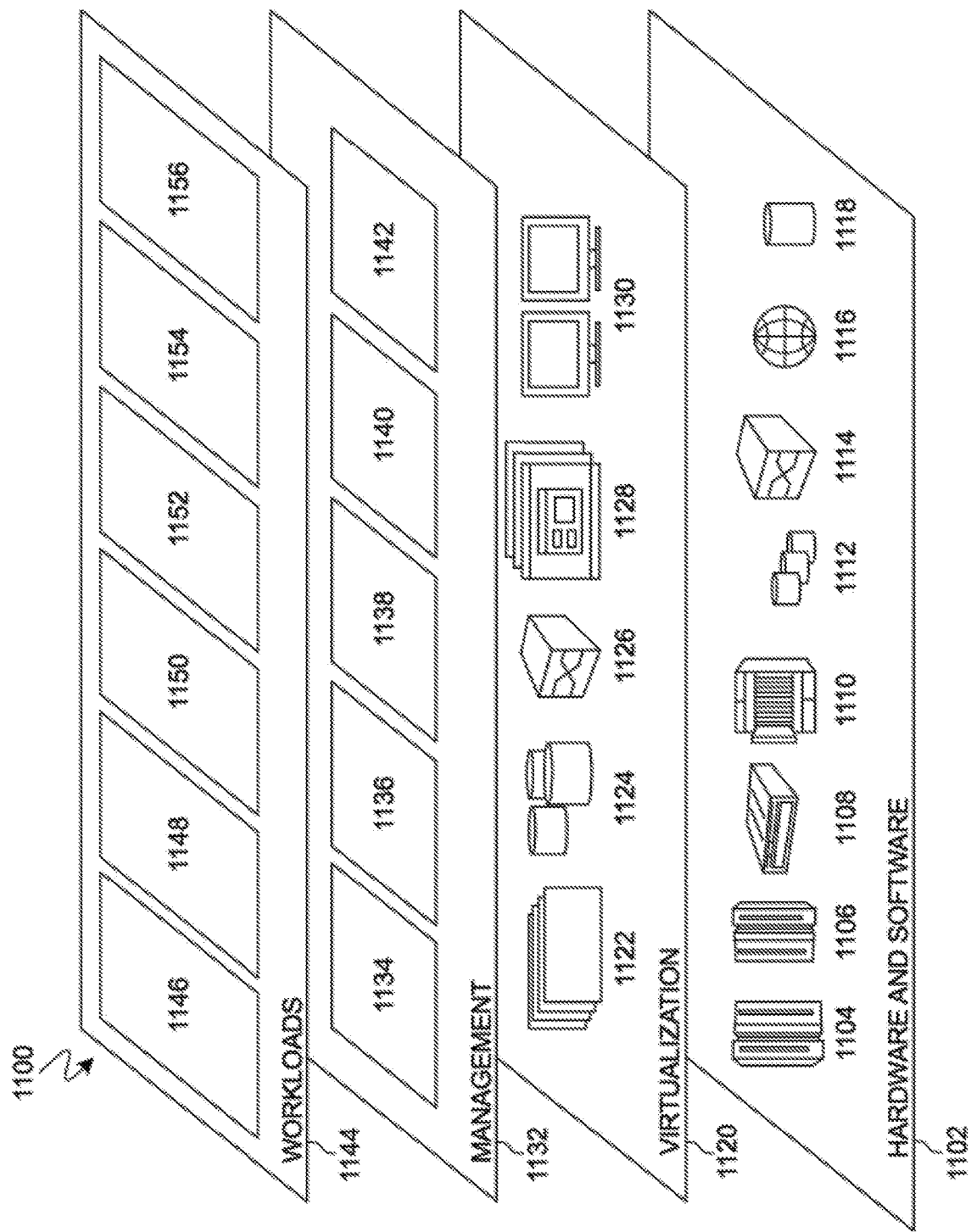

IN-VEHICLE ADJUSTMENT TO DESTINATION ENVIRONMENTAL CONDITIONS

BACKGROUND

The present invention relates generally to the field of computing, and more particularly to regulating environmental conditions within a vehicle.

When an occupant, including a driver, is traveling in a vehicle (e.g., personal car, bus), the interior environment is controlled. However, the external environmental conditions (e.g., temperature, humidity, air pressure) at a vehicle's destination may be significantly different from the current interior environmental conditions (e.g., temperature, humidity, air pressure) of the vehicle. Such differences or sudden changes in environmental conditions may be, at best, uncomfortable for the occupant(s) of the vehicle, or, at worst, cause negative medical consequences for the occupant(s).

SUMMARY

Embodiments of the present invention disclose a method, computer system, and a computer program product for adjusting a plurality of environmental conditions of a vehicle based on the plurality of environmental conditions of an expected destination. The present invention may include monitoring the plurality of environmental conditions of a vehicle by utilizing at least one vehicle device sensor, wherein a comfort level associated with each of the one or more vehicle occupants in the vehicle is determined. The present invention may then include retrieving the plurality of environmental conditions of an expected destination of the vehicle, wherein the retrieved plurality of environmental conditions of an expected destination of the vehicle is based on an estimated time of arrival at the expected destination and the estimated travel time for the vehicle to arrive at the expected destination. The present invention may also include determining a delta between the monitored plurality of environmental conditions of the vehicle and the retrieved plurality of environmental conditions of the expected destination of the vehicle. The present invention may further include adjusting, over a gradual period of time, the monitored plurality of environmental conditions of the vehicle based on the retrieved plurality of environmental conditions of the expected destination of the vehicle and the determined level of comfort associated with each vehicle occupant.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 7 is a block diagram of functional layers of the illustrative cloud computing environment of FIG. 6, in accordance with an embodiment of the present disclosure.

DETAILED DESCRIPTION

Figure 1:
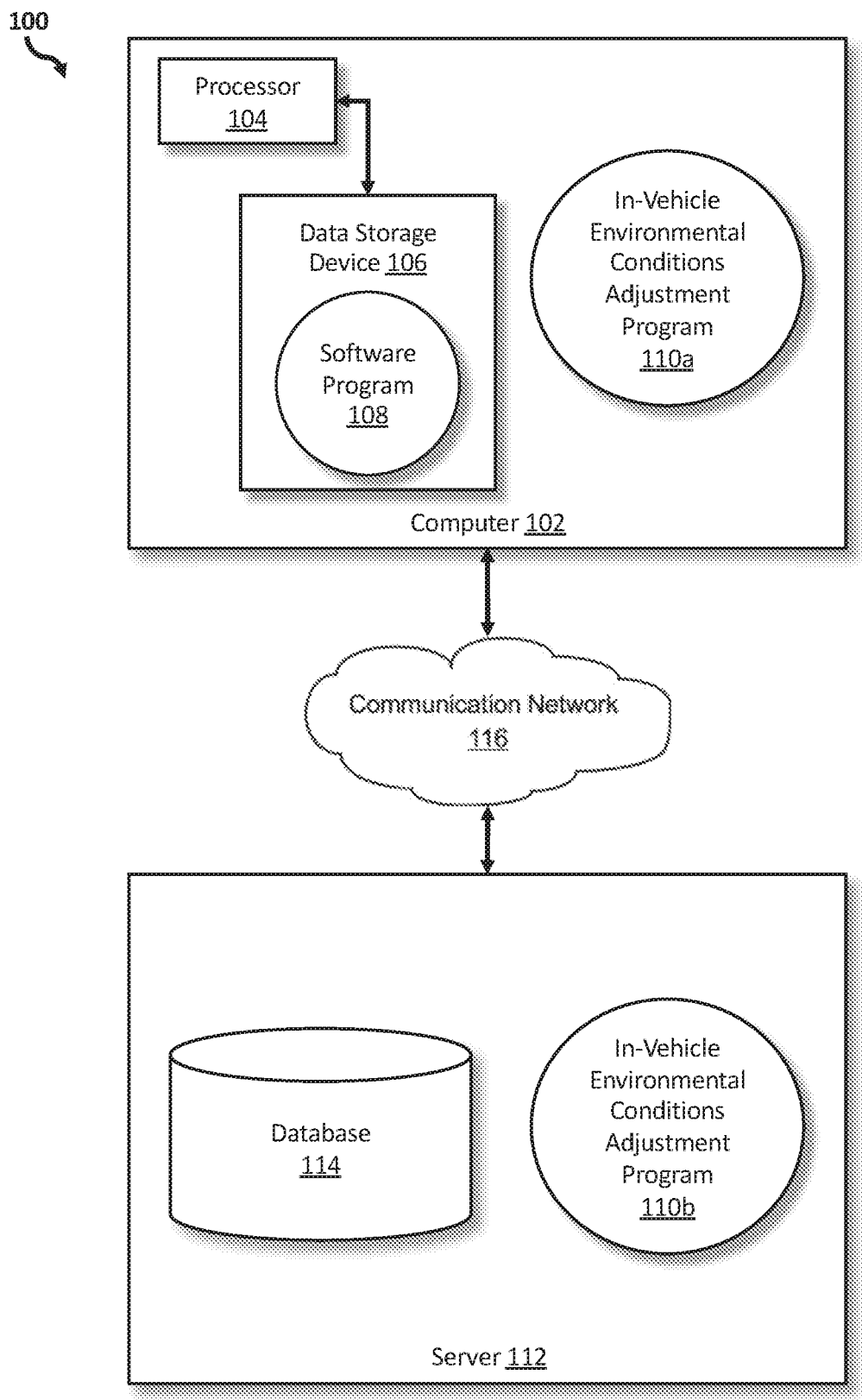
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for adjusting a plurality of internal environmental conditions in a vehicle based on a plurality of destination environmental conditions. As such, the present embodiment has the capacity to improve the technical field of regulating environmental conditions within a vehicle by monitoring the delta between the in-vehicle environmental conditions (e.g., temperature, humidity, air pressure), the occupant comfort level for each vehicle occupant, and the environmental conditions at the expected destination of the vehicle at the estimated time that the vehicle will arrive at the expected destination. The in-vehicle environmental conditions may be gradually adjusted within an acceptable threshold of the expected destination environmental conditions to account for the activity (or activities) of the vehicle occupants at the expected destination (i.e., based on the temporal profile associated with each vehicle occupant), the health limitations for each vehicle occupant (i.e., based on the medical profile associated with each vehicle occupant), and the biometric readings for each vehicle occupant with a wearable device or a mobile device. More specifically, the in-vehicle environmental conditions adjustment program may detect the vehicle is in motion, and may then retrieve the expected destination of the vehicle. The in-vehicle environmental conditions adjustment program may monitor the in-vehicle environmental conditions and may determine the comfort levels for each vehicle occupant. The in-vehicle environmental conditions adjustment program may then retrieve the expected destination environmental conditions. The in-vehicle environmental conditions adjustment program may then calculate the delta and the acceptable threshold. The in-vehicle environmental conditions adjustment program may then utilize the calculated and collected data to gradually adjust the in-vehicle environmental conditions to match the expected destination environmental conditions.

As previously described, when an occupant, including a driver, is traveling in a vehicle (e.g., personal car, bus), the interior environment is controlled. However, the external environmental conditions (e.g., temperature, humidity, air pressure) at a vehicle's destination may be significantly different from the current interior environmental conditions (e.g., temperature, humidity, air pressure) of the vehicle. Such differences or sudden changes in environmental conditions may be, at best, uncomfortable for the occupant(s) of the vehicle, or, at worst, cause negative medical consequences for the occupant(s).

Therefore, it may be advantageous to, among other things, monitor the delta between the in-vehicle environmental conditions (e.g., temperature, humidity, air pressure), the comfort levels of occupants in the vehicle, and the environmental conditions at the expected destination. In addition, it may be advantageous to gradually adjust the in-vehicle environmental conditions to an acceptable threshold of the destination environmental conditions, as well as account for occupants' activity at the destination, occupants' health limitations, and occupant comfort levels.

According to at least one embodiment, the in-vehicle environmental conditions adjustment program may monitor the delta between in-vehicle environmental conditions and expected destination environmental conditions through the analysis of in-vehicle sensors and weather data. First, the in-vehicle environmental conditions adjustment program may monitor the interior of the vehicle to record the in-vehicle environmental conditions based on the in-vehicle temperature, in-vehicle humidity and the in-vehicle air pressure. The present embodiment may utilize an in-vehicle navigation software, or a navigation software associated with a mobile device located within the vehicle, to retrieve the destination of the vehicle. The in-vehicle environmental conditions adjustment program may then retrieve the expected weather forecast for the destination (e.g., destination temperature, destination air pressure, destination humidity) at the expected time of arrival for the vehicle. The present embodiment may then calculate the delta between the current in-vehicle environmental conditions and the expected destination environmental conditions. For example, the difference between the temperature, humidity, air pressure and altitude at the expected destination and the current temperature, current humidity, current air pressure and current altitude in the vehicle.

According to at least one embodiment, the in-vehicle environmental conditions adjustment program may monitor the comfort levels of the vehicle occupants in these conditions including biometric readings, medical profile conditions, and temporal factors, such as what the occupants are wearing or the activity they may be engaged in upon reaching the destination. The in-vehicle environmental conditions adjustment program may measure the current comfort levels of the occupant(s) in the vehicle by utilizing biometric readings, a temporal profile, and a medical profile. The biometric readings may be recorded by a mobile device or a wearable device (e.g., smart watch, augmented reality (AR) glasses, AR gloves) and may include the heart rate, body temperature, breathing rate, and rate of perspiration of the vehicle occupant(s) wearing the wearable device. The temporal profile may include the type of clothes each of the vehicle occupants is wearing and may be derived by utilizing visual recognition of an image captured from an in-vehicle camera. The medical profile of the vehicle occupant(s) may include the degree or level that an individual vehicle occupant may tolerate a large delta change in environmental conditions.

According to at least one embodiment, the in-vehicle environmental conditions adjustment program may gradually modify the in-vehicle environmental conditions for temperature, humidity, and air pressure to enable vehicle occupants to acclimatize to the destination environmental conditions based upon the medical and temporal needs of the vehicle occupant(s) (i.e., including the driver of the vehicle). The in-vehicle environmental conditions adjustment program may utilize an environmental conditions analysis module to, based on the acceptable threshold measurement, gradually adjust the in-vehicle conditions over a period of time. Additionally, the algorithms or calculations performed and derived by the environmental conditions analysis module may be based on the current comfort level of the vehicle occupant(s) and the medical and temporal profiles of each vehicle occupant(s).

In the present embodiment, the in-vehicle environmental conditions adjustment program may also measure the comfort levels of the vehicle occupant(s) as these adjustments are made to ensure that the vehicle occupant(s) remain comfortable as conditions change. If discomfort is detected, the in-vehicle environmental conditions adjustment program may recalculate the environmental conditions applied within the vehicle.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an in-vehicle environmental conditions adjustment program 110a. The networked computer environment 100 may also include a server 112 that is enabled to run an in-vehicle environmental conditions adjustment program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the in-vehicle environmental conditions adjustment program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the in-vehicle environmental conditions adjustment program 110a, 110b (respectively) for in-vehicle environmental conditions adjustment. The in-vehicle environmental conditions adjustment method is explained in more detail below with respect to FIGS. 2, 3 and 4.

Figure 2:
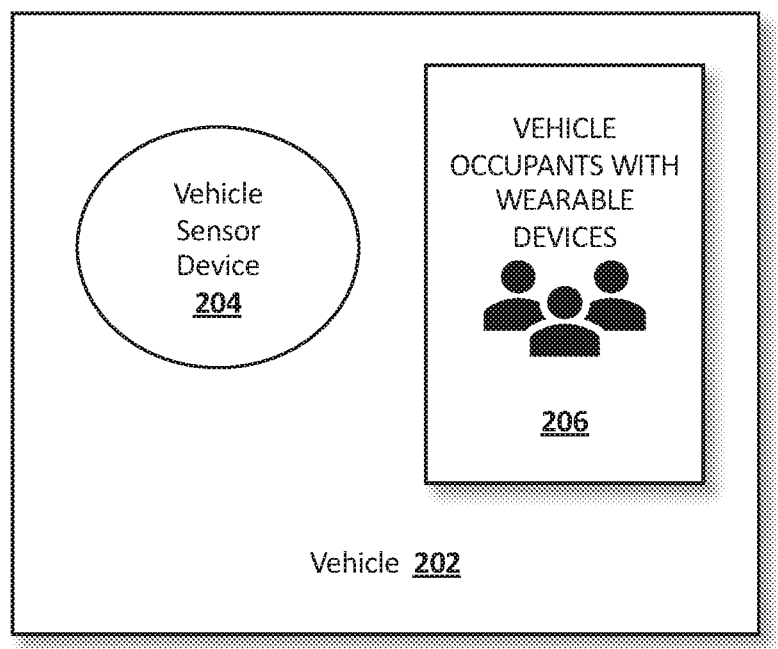
FIG. 2 illustrates a vehicle environment according to at least one embodiment.

Referring now to FIG. 2, an exemplary vehicle environment 200 in accordance with one embodiment is depicted. As shown, the vehicle environment 200 comprises a vehicle 202. Vehicle device sensors 204 may be placed inside the vehicle 202. The specific location of the vehicle device sensors 204 within the vehicle 202 may depend on the specific manufacturer of the vehicle 202 associated with the vehicle device sensors 204.

Additionally, the vehicle environment 200 comprises a vehicle occupant with a wearable device 206. The vehicle occupant with the wearable device 206 may be located inside of the vehicle 202, and the vehicle occupant with the wearable device 206 may include a driver and/or any passenger (e.g., front or back seat passenger) within the vehicle 202. The wearable device may include augmented reality (AR) glasses, AR gloves or smart watch.

In another embodiment, the vehicle occupant with the wearable device 206 may include at least one vehicle occupant with a mobile device (e.g., smart phone) that is able to collect real-time data on the user via biometric sensors, with the consent of the corresponding vehicle occupant.

Figure 3:
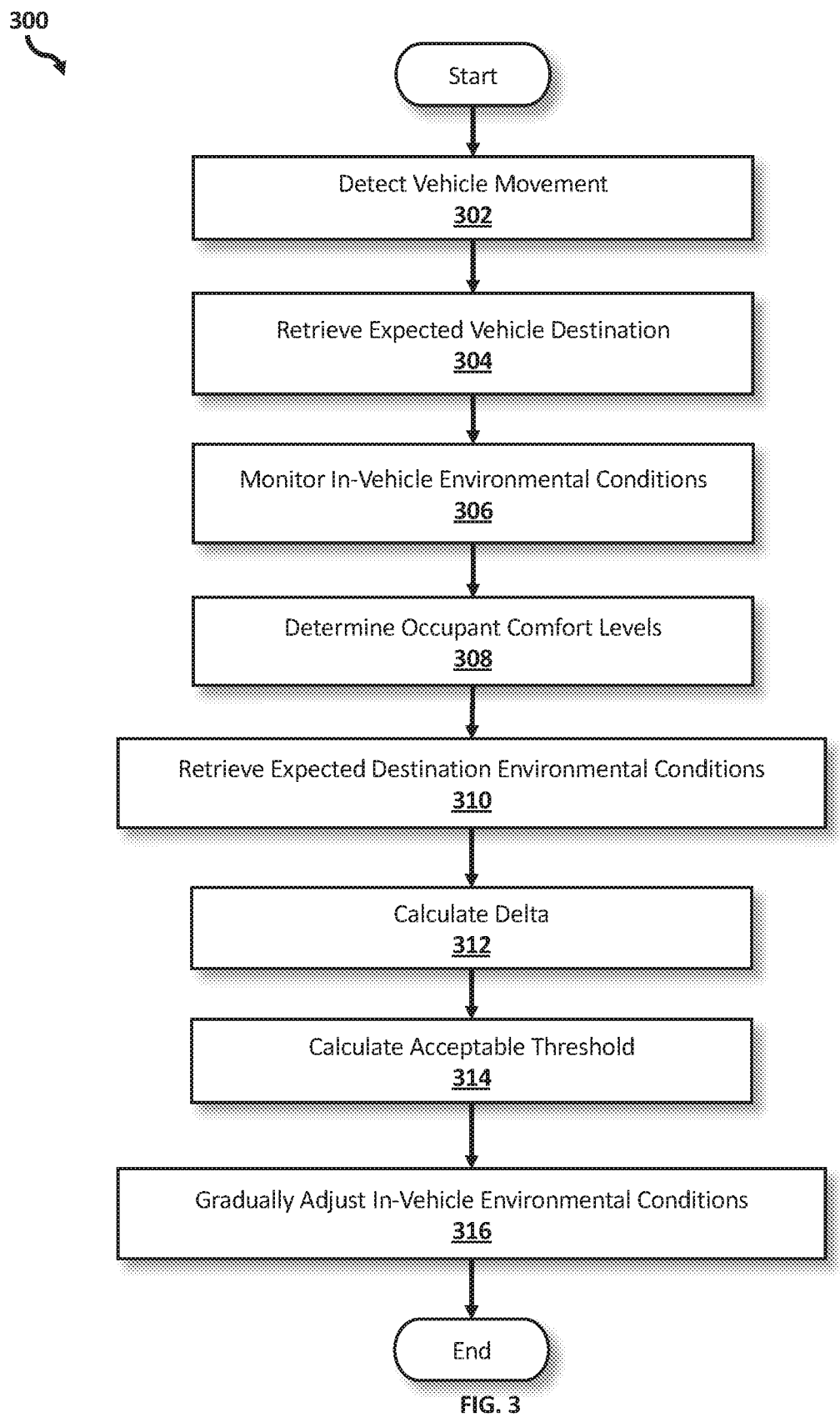
FIG. 3 is an operational flowchart illustrating a process for adjusting the in-vehicle environmental conditions based on the expected destination environmental conditions according to at least one embodiment.

Referring now to FIG. 3, an operational flowchart illustrating the exemplary in-vehicle environmental conditions adjustment process 300 based on the expected destination environmental conditions used by the in-vehicle environmental conditions adjustment program 110a, 110b according to at least one embodiment.

At 302, a vehicle movement is detected. Utilizing a software program 108 on the user's device (e.g., user's computer 102), the in-vehicle environmental conditions adjustment program 110a, 110b may determine that the vehicle 202 associated with the vehicle device sensors 204 is in motion by the movement of the vehicle 202 triggering the activation of the vehicle device sensors 204. Such an event may be transmitted as input into the in-vehicle environmental conditions adjustment program 110a, 110b via the communication network 116. The movement of the vehicle 202 may include the start of the engine, or start of the ignition, associated with vehicle 202.

In at least one embodiment, if the vehicle 202 is parked for a certain period of time (e.g., more than ten minutes), then the vehicle device sensors 204 may be placed in an inactive state, until the vehicle 202 is in motion, even if the engine associated with vehicle 202 has started. Once the vehicle 202 is placed out of the park mode (e.g., the ignition has started and the gear has been switched to park, or the wheels of vehicle 202 start to rotate), the vehicle device sensors 204 may be placed in an active state.

In some embodiments, the vehicle occupant (e.g., vehicle driver) may configure the vehicle settings to modify the certain period of time before the vehicle device sensors 204 are placed in an inactive state. As such, although the default vehicle setting may be ten minutes, a vehicle occupant may modify or change that setting to a preferred period of time.

For example, Vehicle U has five occupants, Occupant Z, Occupant Y, Occupant X, Occupant W and Occupant V.

Each vehicle occupant is wearing a smart watch. Occupant Z is the driver of Vehicle U and after the occupants have fastened their seatbelts, Occupant Z starts the ignition associated with Vehicle U and proceeds to slowly reverse down the driveway to the street. Once the ignition started, the in-vehicle environmental conditions adjustment program 110a, 110b detected that Vehicle U was in motion and then activated the vehicle device sensors 204 associated with Vehicle U.

Next, at 304, an expected destination of the vehicle is retrieved. Utilizing a software program 108 on a user's mobile device or associated with the vehicle 202 (e.g., user's computer 102), the in-vehicle environmental conditions adjustment program 110a, 110b may retrieve the expected destination of the vehicle 202. The in-vehicle environmental conditions adjustment program 110a, 110b may utilize an in-vehicle or a mobile device associated navigation software in which one of the vehicle occupants (i.e., occupants) may indicate the expected destination of vehicle 202. Based on the expected destination of vehicle 202 as indicated by one of the vehicle occupants, the software program 108 may transmit, via a communication network 116, the expected destination of vehicle 202 to the in-vehicle environmental conditions adjustment program 110a, 110b.

In at least one embodiment, the software program 108 may transmit the possible routes to the expected destination of vehicle 202, especially for long journeys, where the expected destination of vehicle 202 is more than a previously determined number of miles (or period of time) (e.g., more than 200 miles or more than three hours) to in-vehicle environmental conditions adjustment program 110a, 110b. In some embodiments, the vehicle occupant (e.g., vehicle driver) may configure the vehicle settings to modify the certain estimated distance or estimated travel time before the software program 108 may transmit, via communication network 116, the possible routes to the in-vehicle environmental conditions adjustment program 110a, 110b. Once the certain estimated distance or estimated travel time has been satisfied or exceeded (i.e., a threshold has been met) based on the determination of the software program 108, then the software program 108 may transmit the possible routes to the in-vehicle environmental conditions adjustment program 110a, 110b.

In the present embodiment, a vehicle occupant may enter, on a mobile device or in-vehicle software program (i.e., depending on the manufacturer of vehicle 202, a vehicle occupant may be able to enter destination data prior to the start of vehicle 202), the expected destination prior to the start of the ignition associated with vehicle 202. The in-vehicle environmental conditions adjustment program 110a, 110b, however, may not retrieve the expected destination until the ignition associated with vehicle 202 has started. In at least one embodiment, the in-vehicle environmental conditions adjustment program 110a, 110b may retrieve the expected destination prior to the start of the ignition associated with vehicle 202. The in-vehicle environmental conditions adjustment program 110a, 110b, however, may not estimate the time of arrival until the ignition of vehicle 202 has started. In some embodiments, the in-vehicle environmental conditions adjustment program 110a, 110b may retrieve the expected destination prior to the start of the ignition associated with vehicle 202 and may estimate the time of arrival to the expected destination. However, the in-vehicle environmental conditions adjustment program 110a, 110b may adjust the estimated time of arrival to the expected destination accordingly when the in-vehicle environmental conditions adjustment program 110a, 110b detects that vehicle 202 is in motion.

Continuing the previous example, Occupant Y, who is the front seat passenger of Vehicle U, proceeds to enter the destination in the in-vehicle navigation system associated with Vehicle U. The expected destination is North Country, a national scenic trail, with the closest entry point approximately 65 miles away from the current location of Vehicle U, with an estimated arrival time of 8:59 AM, about 79 minutes based on current traffic conditions. The in-vehicle environmental conditions adjustment program 110a, 110b retrieves the expected destination, along with the estimated time of arrival based on current traffic conditions, from the in-vehicle navigation system associated with Vehicle U.

Then, at 306, in-vehicle environmental conditions are monitored. Utilizing the vehicle device sensors 204 located inside vehicle 202, the in-vehicle environmental conditions (i.e., environmental conditions inside of vehicle 202, or environmental conditions of vehicle 202) may be continuously monitored. The vehicle device sensors 204 may include a thermometer to measure the temperature, a hygrometer to measure the relative humidity (and temperature, if necessary), and a barometer to measure the air pressure associated with vehicle 202. The monitored in-vehicle environmental conditions may then be transmitted as real-time data, via communication network 116, to the in-vehicle environmental conditions adjustment program 110a, 110b.

In at least one embodiment, the monitored in-vehicle environmental conditions may then be recorded by the vehicle device sensors 204. The recorded in-vehicle environmental conditions may then be saved and stored in a vehicle sensor database (e.g., database 114).

In some embodiments, the in-vehicle environmental conditions adjustment program 110a, 110b may temporarily store the in-vehicle environmental conditions based on the vehicle settings. A vehicle occupant (e.g., vehicle driver) may configure how long (e.g., for a specific distance or for a specific period of time) the in-vehicle environmental conditions adjustment program 110a, 110b may temporarily store the in-vehicle environmental conditions.

In at least one embodiment, the in-vehicle environmental conditions adjustment program 110a, 110b may store the recorded in-vehicle environmental conditions until vehicle 202 reaches the expected destination. Upon reaching the expected destination, the in-vehicle environmental conditions adjustment program 110a, 110b may prompt (e.g., via dialog box) a vehicle occupant to indicate whether the vehicle occupant prefers to save or delete the recorded in-vehicle environmental conditions for the particular journey (e.g., from the place of departure to the arrival at the expected destination). The dialog box, for example, will include "Save" and "Delete" buttons. If the vehicle occupant clicks the "Save" button, then the in-vehicle environmental conditions adjustment program 110a, 110b may prompt the vehicle occupant (e.g., via a second dialog box) to indicate the length of time for which the vehicle sensor database 114 may store the in-vehicle environmental conditions for this particular journey. The dialog box, for example, will include a list of recommended lengths of time (i.e., one day, one week, three weeks, three months), and a comment box for the vehicle occupant to indicate a length of time if the preferred time is excluded in the recommended lengths of time. In some embodiments, the recommended lengths of time may be based on previously selected or indicated lengths of time received by the in-vehicle environmental conditions adjustment program 110a, 110b by a vehicle occupant associated with vehicle 202.

If, however, the vehicle occupant clicks the "Delete" button, then the in-vehicle environmental conditions adjustment program 110a, 110b may immediately delete the recorded in-vehicle environmental conditions associated with this particular journey.

Continuing the previous example, when the ignition associated with the Vehicle U has started, the in-vehicle environmental conditions adjustment program 110a, 110b begins to monitor the in-vehicle environmental conditions associated with Vehicle U by utilizing vehicle device sensors 204 associated with Vehicle U (vehicle device sensors U). Vehicle device sensors U determine that the in-vehicle temperature is 64 degrees Fahrenheit, the in-vehicle air pressure is 1100 mb and the in-vehicle humidity is 55%. Vehicle device sensors U then transmit the monitored in-vehicle environmental conditions to the in-vehicle environmental conditions adjustment program 110a, 110b. Since vehicle device sensors U were previously configured to continuously monitor the in-vehicle environmental conditions associated with Vehicle U and transmit the monitored in-vehicle environmental conditions to the in-vehicle environmental conditions adjustment program 110a, 110b every 10 minutes, while Vehicle U is in motion, the in-vehicle environmental conditions adjustment program 110a, 110b is continuously monitoring and gathering real-time data on the in-vehicle environmental conditions associated with Vehicle U.

Then, at 308, occupant comfort levels are determined. The occupant comfort levels (i.e., level of comfort for each vehicle occupant, or vehicle occupant comfort level) may include biometric readings associated with each of the vehicle occupants with a wearable device (or mobile device), a temporal profile associated with each of the vehicle occupants, and a medical profile associated with each of the vehicle occupants. The in-vehicle environmental conditions adjustment program 110a, 110b may utilize the wearable devices associated with the vehicle occupants with a wearable device 206 to determine the biometric readings of each of the vehicle occupants with a wearable device 206. Utilizing the wearable device (or mobile device) (e.g., user's computer 102), the in-vehicle environmental conditions adjustment program 110a, 110b may retrieve, as input, biometric readings from at least one biometric sensor associated with the wearable device. The biometric readings may be associated with the heart rate (e.g., via heart rate sensor associated with the wearable device or mobile device), respiratory/breathing rate (e.g., via pulse sensor associated with the wearable device or mobile device), body temperature (e.g., via body temperature sensor or fingerprint sensor associated with the wearable device or mobile device), rate of perspiration (e.g., via skin perspiration sensor associated with the wearable device or mobile device), or another form of physiological biometric reading associated with the vehicle occupant with the wearable device 206.

Additionally, the in-vehicle environmental conditions adjustment program 110a, 110b may collect real-time data associated with the temporal profile associated with each of the vehicle occupants (i.e., facts associated with the activities that the vehicle occupants may be engaged in at the expected destination). The in-vehicle environmental conditions adjustment program 110a, 110b may utilize an in-vehicle camera to receive as input, via communication network 116, an image or a form of visual recognition associated with the clothes that each of the vehicle occupants are wearing (e.g., warm clothing for outdoors) for a temporal profile for each of the vehicle occupants. The type of clothes that each of the vehicle occupants is wearing may be included in the temporal profile to determine the type of activities that the vehicle occupants may be engaged in when the vehicle occupants arrived at the expected destination. For example, if the vehicle occupants are wearing multiple layers of warm clothes, then the in-vehicle environmental conditions adjustment program 110a, 110b may determine that the vehicle occupants intend to spend a significant amount of time outdoors.

The in-vehicle environmental conditions adjustment program 110a, 110b may also collect data associated with the medical profile associated with each of the vehicle occupants (i.e., facts associated with the tolerance level of each vehicle occupant to large changes in environmental conditions). Each vehicle occupant may be identified by the in-vehicle environmental conditions adjustment program 110a, 110b. By utilizing the in-vehicle camera, the in-vehicle environmental conditions adjustment program 110a, 110b may determine when a vehicle occupant has entered or left the vehicle 202. Utilizing a software program 108, the in-vehicle environmental conditions adjustment program 110a, 110b may utilize the in-vehicle camera to capture an image of each of the vehicle occupants located in vehicle 202 when movement of vehicle 202 has been detected. The captured image of each of the vehicle occupants may then be received as input, via communication network 116, into the in-vehicle environmental conditions adjustment program 110a, 110b. The in-vehicle environmental conditions adjustment program 110a, 110b may then search a user database (e.g., database 114) in which medical profiles associated with each previous vehicle occupant of this specific vehicle 202 may be stored. The user database 114 may include a picture of the vehicle occupant, name, personal contact information, devices associated with the vehicle occupant (e.g., wearable devices, mobile device), medical data associated with the vehicle occupant, and any preferences of the vehicle occupant. Once the image taken by the in-vehicle camera is matched with the medical profile of a previous vehicle occupant of this specific vehicle 202, then the in-vehicle environmental conditions adjustment program 110a, 110b may access, via communication network 116, the medical profile associated with the identified vehicle occupant.

In the present embodiment, the in-vehicle environmental conditions adjustment program 110a, 110b may receive the consent, via a opt-in or opt-out feature, of the corresponding vehicle occupant prior to commencing the data monitoring and/or collection of the biometric readings associated with the corresponding vehicle occupant, and the access to the medical profile of the corresponding vehicle occupant. In some embodiments, the in-vehicle environmental conditions adjustment program 110a, 110b may notify (e.g., via dialog box) the vehicle occupant when the data collection begins.

In another embodiment, the mobile device or wearable device associated with the vehicle occupant may detect that the vehicle occupant is located in vehicle 202, and a software program 108 associated with the wearable device or mobile device may prompt (e.g. via dialog box) the vehicle occupant with the wearable device or mobile device to confirm that the vehicle occupant is located in vehicle 202. Once the vehicle occupant with the wearable device or mobile device 206 confirms that the vehicle occupant is located in vehicle 202, the in-vehicle environmental conditions adjustment program 110a, 110b may then access, via communication network 116, the user database 114 with the medical profile associated with the identified vehicle occupant with a wearable device or mobile device 206.

In at least one embodiment, a list of vehicle occupants may be presented or displayed on a screen or monitor located inside of vehicle 202, via auditory command inside of vehicle 202, or via virtual assistant inside of vehicle 202. The in-vehicle environmental conditions adjustment program 110a, 110b may then prompt (e.g., via dialog box) one of the vehicle occupants to confirm that the list of vehicle occupants is accurate. The in-vehicle environmental conditions adjustment program 110a, 110b may then display a prompt (e.g., via dialog box) if there are any issues identifying the vehicle occupants. The dialog box, for example, will indicate that the in-vehicle environmental conditions adjustment program 110a, 110b successfully identified the two vehicle occupants as Occupant A and Occupant B.

If, however, the in-vehicle environmental conditions adjustment program 110a, 110b is unable to identify a vehicle occupant, the in-vehicle environmental conditions adjustment program 110a, 110b may notify (e.g., via dialog box) the vehicle occupants that the in-vehicle environmental conditions adjustment program 110a, 110b is unable to identify all the vehicle occupants of vehicle 202. Depending on the manufacturer of vehicle 202, the in-vehicle environmental conditions adjustment program 110a, 110b may utilize a software program 108 to indicate the specific location inside of vehicle 202 that the unidentified vehicle occupant (e.g., front seat passenger, back seat passenger behind the driver) is located. If the unidentified vehicle occupant has a wearable device or mobile device, then the unidentified vehicle occupant may, via a software program 108 associated with the unidentified vehicle occupant's mobile device or wearable device, create a medical profile, and transmit, via communication network 116, the created medical profile to the in-vehicle environmental conditions adjustment program 110a, 110b. The medical profile may include the name, personal contact information, devices associated with the vehicle occupant (e.g., wearable devices, mobile device), medical data associated with the vehicle occupant (e.g., significant changes in temperature causes dizziness, or experiences difficulty breathing and lightheadedness when air pressure decreases below 800 millibars (mb)), and any preferences of the unidentified vehicle occupant (e.g., prefers cooler temperatures ranging between 55 degrees Fahrenheit to 68 degrees Fahrenheit). The created medical profile, and any captured image of the unidentified vehicle occupant (if applicable), may be stored in the user database 114.

If, however, the in-vehicle environmental conditions adjustment program 110a, 110b incorrectly identifies one of the vehicle occupants (e.g., the in-vehicle environmental conditions adjustment program 110a, 110b inaccurately identifies Occupant A, instead of Occupant C), then the misidentified vehicle occupant may utilize a software program 108 associated with the wearable device or mobile device to indicate the correct identity of the vehicle occupant. The misidentified vehicle occupant may enter as input, via communication network, the correct name of the misidentified vehicle occupant. The in-vehicle environmental conditions adjustment program 110a, 110b may then search the user database 114 to access, via communication network 116, the corresponding medical profile for the misidentified vehicle occupant. The in-vehicle environmental conditions adjustment program 110a, 110b may then correct the list of vehicle occupants to replace the erroneous identity of the vehicle occupant with the correct identity of the vehicle occupant. If the correct vehicle occupant is not a previous vehicle occupant or the in-vehicle environmental conditions adjustment program 110a, 110b is unable to locate the medical profile associated with the misidentified vehicle occupant, then the in-vehicle environmental conditions adjustment program 110a, 110b may prompt (e.g., via a dialog box) the misidentified vehicle occupant to create a new medical profile.

In another embodiment, if at least one of the vehicle occupants does not have a wearable device or a mobile device, the in-vehicle environmental conditions adjustment program 110a, 110b may still identify the vehicle occupant without a wearable device or mobile device in vehicle 202, and may still collect data associated with the medical and temporal profiles of the vehicle occupant without a wearable device or mobile device. If the vehicle occupant without a wearable device or mobile device is a previous vehicle occupant in vehicle 202, then the in-vehicle environmental conditions adjustment program 110a, 110b may match the image of the vehicle occupant with a corresponding medical profile. As such, the in-vehicle environmental conditions adjustment program 110a, 110b may attempt to gather any necessary information in regards to the vehicle occupant, except biometric readings since the vehicle occupant does not have a wearable device or mobile device to gather such real-time data for the in-vehicle environmental conditions adjustment program 110a, 110b.

Continuing the previous example, since each of the vehicle occupants are wearing a smart watch, the in-vehicle environmental conditions adjustment program 110a, 110b is easily able to collect real-time data on each of the occupants' biometric readings, such as heart rate, respiratory rate, body temperature and rate of perspiration. Based on the collected real-time data, the biometric readings for each of the occupants are determined to be in a normal range with no abnormalities. Since each of the occupants are wearing a smart watch, the in-vehicle environmental conditions adjustment program 110a, 110b is also able to identify each of the occupants since each were previous occupants in Vehicle U and their smart watches were previously recognized devices associated with their medical profiles. As such, the in-vehicle environmental conditions adjustment program 110a, 110b is able to access the vehicle occupants' medical profiles from the user database 114. The in-vehicle environmental conditions adjustment program 110a, 110b then lists the vehicle occupants (Occupants Z, Y, X, W and V) on the screen located on the dashboard of Vehicle U. The in-vehicle environmental conditions adjustment program 110a, 110b then prompts, with a dialog box, one of the vehicle occupants to confirm the identity of the vehicle occupants. The dialog box, on the screen, asks "are all the vehicle occupants properly identified on the screen?" Occupant Y clicks the "Yes" button located below the question in the dialog box. The dialog box then disappears.

Additionally, the in-vehicle environmental conditions adjustment program 110a, 110b captures an image via the in-vehicle camera of the occupants, namely the type of clothing each vehicle occupant is wearing, for the temporal profile. Each vehicle occupant is wearing hiking boots, multiple layers of clothing, hats and back packs.

Then, at 310, expected destination environmental conditions are retrieved. Utilizing a software program 108 (e.g., user's computer 102) and the expected destination as determined by another software program 108 associated with vehicle 202 or mobile device of one of the vehicle occupants, the in-vehicle environmental conditions adjustment program 110a, 110b may retrieve, via communication network 116, the expected destination environmental conditions (i.e., weather data, or environmental conditions of the expected destination) at the time that vehicle 202 is anticipated to arrive at the expected destination. The weather data may include destination temperature, destination air pressure and destination humidity at the estimated time of arrival for vehicle 202.

In at least one embodiment, if the in-vehicle environmental conditions adjustment program 110a, 110b receives, as input, the possible routes of vehicle 202 while in route to the expected destination, then the in-vehicle environmental conditions adjustment program 110a, 110b retrieve, as input, via a communications network 116, the expected weather forecast for multiple locations along the possible routes at the estimated time of arrival. As such, if the vehicle occupants have to make a stop while traveling to the expected destination, the in-vehicle environmental conditions adjustment program 110a, 110b may be able to adjust the in-vehicle environmental conditions accordingly.

Continuing the previous example, the in-vehicle environmental conditions adjustment program 110a, 110b then, by utilizing a weather-based application, determines the environmental conditions at North Country at the estimated time of arrival, 8:59 AM. The weather-based application determines the estimated temperature will be 55 degrees Fahrenheit, the estimated humidity is 40%, and the estimated air pressure is 950 mb.

In another embodiment, the expected destination, depending on the size of the expected destination, weather conditions (e.g., rain, storms, winds), or topography (e.g., different altitudes due to mountains or plateaus) may include a range of environmental conditions. For example, if Occupants G and H are going hiking in the Catskills, the in-vehicle environmental conditions adjustment program 110a, 110b may determine that the environmental conditions at the expected destination include a temperature range of 35-46 degrees Fahrenheit, an air pressure range of 900-1,069 mb and a humidity range of 40-50%. As such, the in-vehicle environmental conditions adjustment program 110a, 110b may utilize only the exact environmental conditions at the entry point of the hiking trail. In at least one embodiment, the in-vehicle environmental conditions adjustment program 110a, 110b may determine the average or mean for the range of the expected destination environmental conditions (i.e., average value), and utilize the average value to further determine the delta or the acceptable threshold to adjust the in-vehicle environmental conditions to correspond with the expected destination environmental conditions.

In another embodiment, the software program 108, utilized by the in-vehicle environmental conditions adjustment program 110a, 110b to retrieve the expected destination environmental conditions, may continuously monitor the expected destination environmental conditions, and emit an alert to the in-vehicle environmental conditions adjustment program 110a, 110b, when a significant change (e.g., default may be a change of more than two degrees Fahrenheit in temperature, more than three percent in humidity, and more than 10 mb in air pressure) has been detected by the software program 108. A vehicle occupant or administrator may modify or configure the settings for the software program 108 to define what may be considered a significant change. As such, the software program 108 may emit an alert or signal to the in-vehicle environmental conditions adjustment program 110a, 110b, when the modified significant change for each of the environmental conditions is detected.

Then, at 312, the delta is calculated. The in-vehicle environmental conditions adjustment program 110a, 110b may utilize an environmental conditions analysis module to calculate the delta (i.e., environmental condition delta) between the current in-vehicle environmental conditions and the environmental conditions at the expected destination at the estimated time of arrival. The delta may be calculated by subtracting each of the corresponding values from each other (e.g., subtracting the temperature value associated with the expected destination from the temperature value associated with the vehicle). For example, the in-vehicle environmental conditions adjustment program 110a, 110b will, by utilizing the environmental conditions analysis module, determine the difference between each of the values associated with the air pressure, temperature and humidity in the vehicle and the expected destination at the estimated time of arrival.

In some embodiments, the environmental conditions analysis module may utilize statistics that compare the proposed delta with one or more historical deltas (e.g. the historical delta may be associated with one or more previously calculated deltas for the same or a closely located expected destination and in-vehicle environmental conditions) to influence the calculation of the current delta. For example, the current delta may be low, but a majority of the historical data suggests that a higher delta may be a more likely appropriate delta in order for the in-vehicle environmental conditions to match the expected destination environmental conditions. In at least one embodiment, the environmental conditions analysis module may decide to utilize the delta associated with the historical data, if safety or other factors may be a concern. The components and analysis performed by the environmental conditions analysis module will be described in greater detail below with respect to FIG. 4.

Continuing the previous example, the in-vehicle environmental conditions adjustment program 110a, 110b generates the following Table 1 to compare the environmental conditions in Vehicle U and the environmental conditions for the entry point for the North Country trail:

TABLE 1

|  | Expected Destination Environmental Conditions (Entry Point of the North Country Trail) | In-Vehicle Environmental Conditions (Vehicle U) |
| --- | --- | --- |
| Temperature (Fahrenheit) | 55 degrees | 64 degrees |
| Humidity (%) | 40% | 55% |
| Air Pressure (mb) | 950 mb | 1,100 mb |

Based on the in-vehicle environmental conditions and the environmental conditions at the entry point for the North Country trail, the in-vehicle environmental conditions adjustment program 110a, 110b, by utilizing the environmental conditions analysis module, calculates the following delta for each of the environmental conditions:

Temperature: −9 degrees Fahrenheit
Humidity: −15%
Air Pressure: −150 mb.

Then, at 314, an acceptable threshold for environmental condition delta is calculated. The in-vehicle environmental conditions adjustment program 110a, 110b may then calculate the acceptable delta (i.e., threshold or optimal threshold) between the current in-vehicle environmental conditions and the expected destination environmental conditions at the estimated time of arrival. The in-vehicle environmental conditions adjustment program 110a, 110b may utilize the environmental conditions analysis module to analyze the current comfort levels, medical profiles and temporal profiles associated with each of the vehicle occupants. The components and analysis performed by the environmental conditions analysis module will be described in greater detail below with respect to FIG. 4. The results (i.e., output) generated by the environmental conditions analysis module may then be utilized by the in-vehicle environmental conditions adjustment program 110a, 110b to calculate the optimal (i.e., acceptable) threshold to adjust the in-vehicle environmental conditions. The optimal threshold may be a mean (or average) that represents a basis for determining the most acceptable threshold by a sole vehicle occupant or a group of vehicle occupants, where adjustments may be made for the group of vehicle occupants based on a matter of policy (e.g., greater weight may be assigned to a vehicle occupant who is elderly, an infant or an occupant with specific medical conditions).

In at least one embodiment, the in-vehicle environmental conditions adjustment program 110a, 110b, by utilizing the environmental conditions analysis module, may determine the optimal threshold on a case-by-case basis based on policy, or the optimal threshold may be learned over time when the same group of vehicle occupants under similar conditions are present. For example, if the Occupants Q and T carpool to work every morning, then the in-vehicle environmental conditions adjustment program 110a, 110b, through the environmental conditions analysis module, may, over time, learn the environmental conditions associated with the vehicle and the expected destination, as well as the preferences, medical profiles and temporal profiles associated with Occupants Q and T, thereby creating the same optimal threshold when Occupants Q and T are carpooling to work.

In at least one embodiment, the environmental conditions analysis module may apply a K-means clustering algorithm (i.e., an unsupervised learning algorithm that utilizes unlabeled data and finds groups in the data, with the number of groups represented by the variable K) to the vehicle occupants based on the preferences of the vehicle occupants and the pattern history inclusive of sensory parameters (e.g., vehicle device sensors 204). By utilizing the K-means clustering algorithm, the in-vehicle environmental conditions adjustment program 110a, 110b, through the environmental conditions analysis module, collects data associated with the environmental conditions of the vehicle and the expected destination, as well as the biometric readings from the vehicle occupants, and plots the data on a dataset. Then, the environmental conditions analysis module may determine the K variable (or groups for the plotted data), and then the K-means algorithm splits the data into determined groups and computes the final results for each group. For example, for the biometric readings of four occupants taken every 5 minutes for a 3 hour long drive, the in-vehicle environmental conditions adjustment program 110a, 110b will utilize the K-means clustering algorithm to plot the data collected by the biometric sensors to determine the occupant comfort level of the four occupants. As such, the largest area of clustered data points will be considered data that may be utilized to compute the acceptable threshold. However, data outside of the clustered data points may be ignored, or considered an outlier when computing the acceptable threshold.

In the present embodiment, if multiple vehicle occupants are present in vehicle 202, then the in-vehicle environmental conditions adjustment program 110a, 110b, by utilizing the environmental conditions analysis module, may weigh the priority of the vehicle occupants and derive an acceptable threshold that accommodates the vehicle occupants who are the most susceptible to environmental condition changes, such as infants, elderly and those incapacitated by medical conditions or illness. For example, if Occupants A, B, C and D are traveling together in vehicle 202, and Occupant C is very sensitive to sudden exposure to temperature differences, then the environmental conditions analysis module will consider Occupant C's medical profile as a priority thereby considering Occupant C a priority and focusing on accommodating Occupant C in vehicle 202.

Continuing the previous example, the in-vehicle environmental conditions adjustment program 110a, 110b, by utilizing the environmental conditions analysis module, determines that none of the occupants of Vehicle U have any medical limitations or issues, and none of the occupants are in a group that requires priority compared to the other occupants of Vehicle U. The in-vehicle environmental conditions adjustment program 110a, 110b then utilizes the environmental condition analysis module to determine the acceptable threshold of each of the environmental conditions based on each of the occupants. The following Table 2 is a table for acceptable threshold values (i.e., changes in the environmental conditions) for each of the occupants in Vehicle U:

TABLE 2

|  | Occupant Z | Occupant Y | Occupant X | Occupant W | Occupant V |
|---|---|---|---|---|---|
| Temperature (degrees Fahrenheit) | +/−5 degrees every 10 minutes | +/−10 degrees every 10 minutes | +/−5 degrees every 10 minutes | +/−6 degrees every 10 minutes | +/−4 degrees every 10 minutes |
| Humidity (%) | +/−10% every 10 minutes | +/−5% every 10 minutes | +/−5% every 10 minutes | +/−10% every 10 minutes | +/−5% every 10 minutes |
| Air Pressure (mb) | +/−25 mb every 10 minutes | +/−25 mb every 10 minutes | +/−30 mb every 10 minutes | +/−30 mb every 10 minutes | +/−30 mb every 10 minutes |

As such, the following is an average of the acceptable threshold of each of the occupants (i.e., group of occupants):

Temperature: A decrease of 6 degrees every 10 minutes

Humidity: A decrease of 7% every 10 minutes (preferably closer to 5-7% every 10 minutes to ensure high comfort levels for Occupants Y, X and V)

Air Pressure: A decrease of 30 mb every 10 minutes (preferably closer to 25 mb every 10 minutes to ensure high comfort levels for Occupants Z and Y).

Then, at 316, in-vehicle environmental conditions are gradually adjusted. The environmental conditions analysis module may utilize the acceptable threshold to gradually adjust the in-vehicle environmental conditions over the course of the journey to the expected destination. As vehicle 202 travels to the expected destination, the in-vehicle environmental conditions may be adjusted accordingly to assist the vehicle occupants in acclimatizing to the environmental conditions at the expected destination. The adjustment may be gradual over time. For example, the environmental conditions analysis module may slowly raise the temperature, or adjust the humidity in vehicle 202 based on the estimated travel time of vehicle 202. The components and analysis performed by the environmental conditions analysis module will be described in greater detail below with respect to FIG. 4.

Additionally, the in-vehicle environmental conditions adjustment program 110a, 110b may continue to monitor the comfort levels of the vehicle occupants during the gradual adjustments to the in-vehicle environmental conditions, thereby ensuring that the vehicle occupants remain comfortable as in-vehicle environmental conditions change.

In the present embodiment, the in-vehicle environmental conditions adjustment program 110a, 110b, by utilizing the environmental conditions analysis module, may generate a score (e.g., normalized quantity ranging from 0-1, 0-10) for the level of comfort for each vehicle occupant. An average occupant comfort level number may be previously determined (e.g., a score of 5 out of 10 will be considered average, and any score greater than 5 may be considered a high occupant comfort level and any score less than 5 may be considered a low occupant comfort level). The lower the score, the lower the level of comfort for the vehicle occupant (e.g., greater the level of discomfort associated with the vehicle occupant) and the higher the score, the higher the level of comfort for the vehicle occupant (e.g., the lower the level of discomfort associated with the vehicle occupant).

In some embodiments, the in-vehicle environmental conditions adjustment program 110a, 110b, by utilizing the environmental conditions analysis module, may generate a percentage (e.g., normalized quantity ranging from 0-100%) to determine the occupant comfort level. An average occupant comfort level percentage may be previously determined (e.g., 50% out of 100% will be considered average, and any percentage greater than 50% may be considered a high occupant comfort level and any percentage less than 50% may be considered a low occupant comfort level). The lower the percentage, the lower the level of comfort for the vehicle occupant (e.g., greater the level of discomfort associated with the vehicle occupant), and the higher the percentage, the higher the level of comfort for the vehicle occupant (e.g., the lower the level of discomfort associated with the vehicle occupant).

If the in-vehicle environmental conditions adjustment program 110a, 110b, by utilizing one or more biometric sensors on a wearable device or a mobile device, or in-vehicle camera, detects discomfort (e.g., the environmental conditions are not at the desired level for the occupant thereby creating a low occupant comfort level) for one of the vehicle occupants, then the in-vehicle environmental conditions adjustment program 110a, 110b may recalculate the in-vehicle environmental conditions applied within vehicle 202 to eliminate or minimize the discomfort of the vehicle occupants. An occupant may display discomfort in a variety of ways (e.g., verbalize a complaint, attempt to manually adjust the environmental controls (air conditioning in the vehicle) in the vehicle). In another example, the vehicle occupant may be more prone to movement, and as such, if the vehicle is too hot or dry, then vehicle occupant use a hand fan, change the environmental controls in the vehicle, remove layers of clothing, or wind down the windows of the vehicle. If, however, the vehicle is too cold, then the vehicle occupant may be prone to tremors or shaking.

Continuing the previous example, the in-vehicle environmental conditions adjustment program 110a, 110b then further utilizes the environmental conditions analysis module to generate a gradual adjustment in the environmental conditions of Vehicle U to match the environmental conditions of the entry point of the North Country trail, which includes the following:

Temperature: A decrease of 1.4 degrees Fahrenheit every 10 minutes

Humidity: A decrease of 1% every 5 minutes

Air Pressure: A decrease of 20 mb every 10 minutes.

As such, the environmental conditions in Vehicle U are continuously increasing or decreasing in smaller increments generated by the environmental conditions analysis module to ensure that the incremental changes in the gradual adjustment for temperature, humidity and air pressure are satisfied at a consistent and steady pace, for the specific time period in the generated gradual adjustment.

The in-vehicle environmental conditions adjustment program 110a, 110b will continue to monitor the biometric readings and comfort levels of the occupants to ensure that the occupants do not experience discomfort during the gradual adjustment. Throughout the 79-minute journey to the entry point of the North Country trail, the in-vehicle environmental conditions adjustment program 110a, 110b fails to detect a change in comfort level of any of the occupants. Therefore, there were no changes to the gradual adjustment.

In the present embodiment, the in-vehicle environmental conditions adjustment program 110a, 110b may stop monitoring the occupant comfort level when the vehicle 202 arrives at the expected destination and the vehicle device sensors 204 determine that the vehicle is no longer in motion (i.e., in an inactive state). The vehicle device sensors 204 may determine that the vehicle 202 is in an inactive state when the vehicle is parked for an extended period of time (e.g., for more than 30 minutes), or the ignition associated with the vehicle 202 is turned off. The in-vehicle environmental conditions adjustment program 110a, 110b may then stop monitoring the occupant comfort level, until the vehicle device sensors 204 detect that vehicle 202 is in motion.

Figure 4:
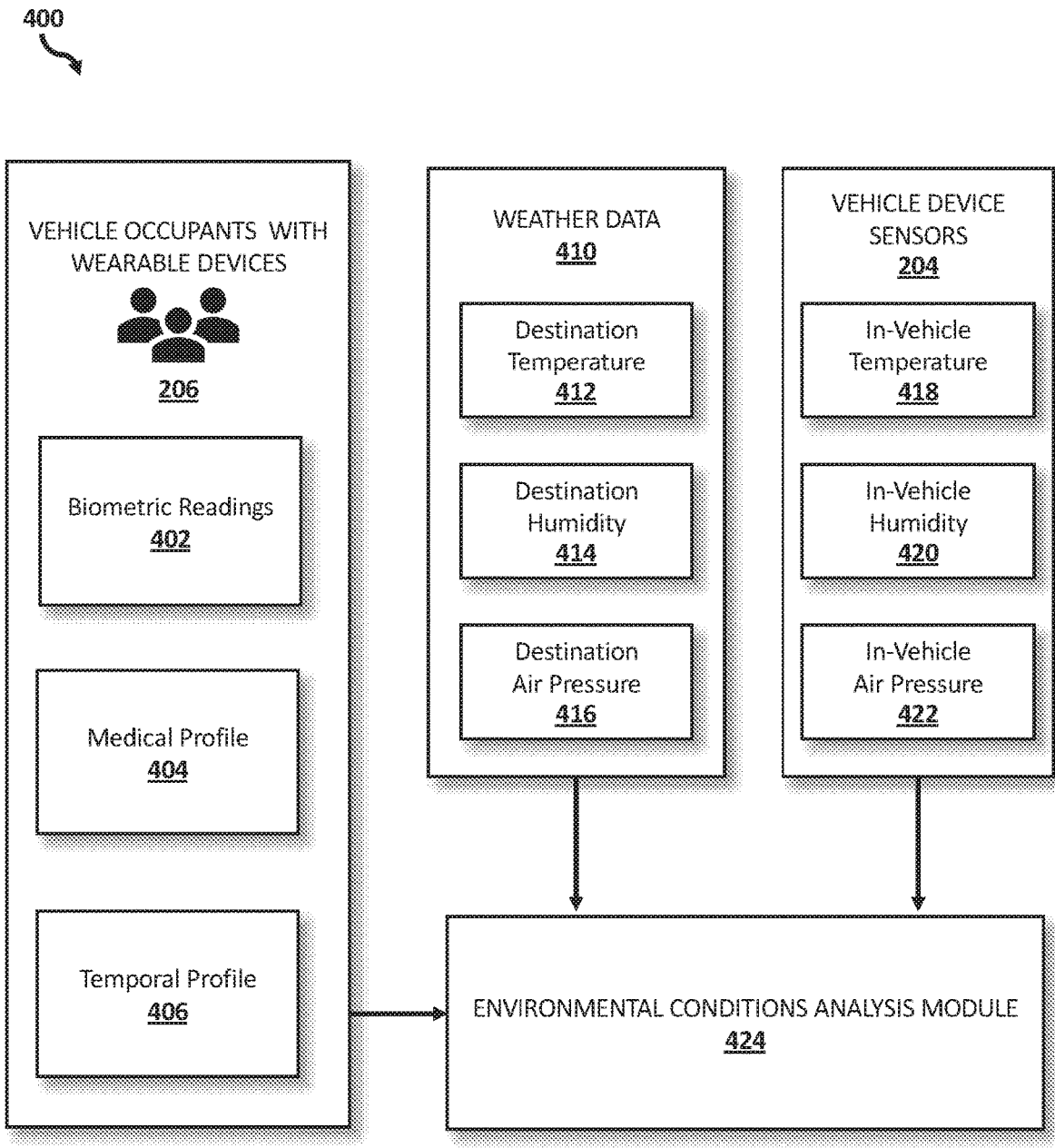
FIG. 4 is a block diagram of the components and analysis utilized by the environmental conditions analysis module according to at least one embodiment.

Referring now to FIG. 4, a block diagram 400 illustrating the components and analysis utilized by the environmental conditions analysis module according to at least one embodiment is depicted.

As shown, biometric readings 402, a medical profile 404 and a temporal profile 406 may be derived from each of the vehicle occupants with a wearable device 206 in vehicle 202. The in-vehicle environmental conditions adjustment program 110a, 110b may also collect weather data 410 associated with the destination environmental conditions at the estimated time of vehicle 202's arrival, including destination temperature 412, destination humidity 414 and destination air pressure 416. Additionally, vehicle device sensors 204 may collect real-time data associated with the in-vehicle environmental conditions, including in-vehicle temperature 418, in-vehicle humidity 420 and in-vehicle air pressure 422. The real-time data collected from the vehicle occupants with wearable devices 206, the weather data 410 and the vehicle device sensors 204 may then be fed, as input, into the environmental conditions analysis module 424, via communication network 116.

The environmental conditions analysis module 424 may then utilize descriptive statistics (i.e., summarize data for patterns to emerge from the data) to analyze the real-time data associated with the vehicle occupants with wearable devices 206, the weather data 410 and the vehicle device sensors 204. By utilizing descriptive statistics, the environmental conditions analysis module 424 may utilize measures of frequency (e.g., counting, percentages, frequency), measures of central tendency (or centrality) (e.g., mean, mode, median), measures of dispersion or variation (e.g., range, variance, standard deviation), or measures of position (e.g., percentile ranks, quartile ranks) to categorize and summarize each environmental condition (e.g., temperature, humidity and air pressure) from the wearable device (or mobile device), weather data 410 and vehicle device sensors 204, and therefore, compute the delta and acceptable threshold, and adjust the in-vehicle environmental conditions towards a desired mean or some other target (e.g., historical data, based on the preferences of the vehicle occupants). Likewise, the descriptive statistics, when accumulated in a historical fashion and stored in a database (e.g., database 114), may form a basis for later predictive models (e.g., a part of the historical data that may be utilized with the same group of vehicle occupants or sole vehicle occupant to the same expected destination).

For example, if the expected destination of Vehicle J is a large geographical area with a varied range in temperature, humidity and air pressure, and the occupants of Vehicle J include three persons (Occupants K, L and M) in which only Occupants K and M are using wearable devices, then the environmental conditions analysis module 424 will summarize the data generated on the expected destination, as well as data from the biometric readings from Occupants K and M, and the medical and temporal profiles from Occupants K, L and M to calculate an acceptable threshold and gradual adjustment of the in-vehicle environmental conditions. The environmental conditions analysis module 424 will calculate the median number for each of the environmental conditions in the vehicle and at the expected destination. The environmental conditions analysis module 424 will then calculate a delta by subtracting each of the in-vehicle environmental conditions from the corresponding expected destination environmental conditions. The environmental conditions analysis module 424 may then calculate an acceptable threshold by comparing the medical and temporal profiles of the occupants to determine any medical limitations or past instances where the occupant comfort level changed, as well as continuously monitor the biometric readings of Occupants K and M. Based the calculated delta and acceptable threshold, the environmental conditions analysis module 424 will determine the gradual adjustments to the in-vehicle environmental conditions.

The functionality of a computer may be improved by the in-vehicle environmental conditions adjustment program 110a, 110b because the in-vehicle environmental conditions adjustment program 110a, 110b may monitor the delta between the in-vehicle environmental conditions (e.g., temperature, humidity, air pressure), the occupant comfort levels for each vehicle occupant, and the environmental conditions at the expected destination of the vehicle at the estimated time that vehicle 202 will arrive at the expected destination. The in-vehicle environmental conditions adjustment program 110a, 110b may then gradually adjust the in-vehicle environmental conditions within an acceptable threshold of the expected destination environmental conditions, accounting for the activity of the vehicle occupants at the expected destination based on the temporal profile associated with each vehicle occupant, the health limitations for each vehicle occupant based on the medical profile associated with each vehicle occupant, and the biometric readings for each vehicle occupant with a wearable device or a mobile device.

It may be appreciated that FIGS. 2, 3 and 4 provide only an illustration of one embodiment and do not imply any limitations with regard to how different embodiments may be implemented. Many modifications to the depicted embodiment(s) may be made based on design and implementation requirements.

Figure 5:
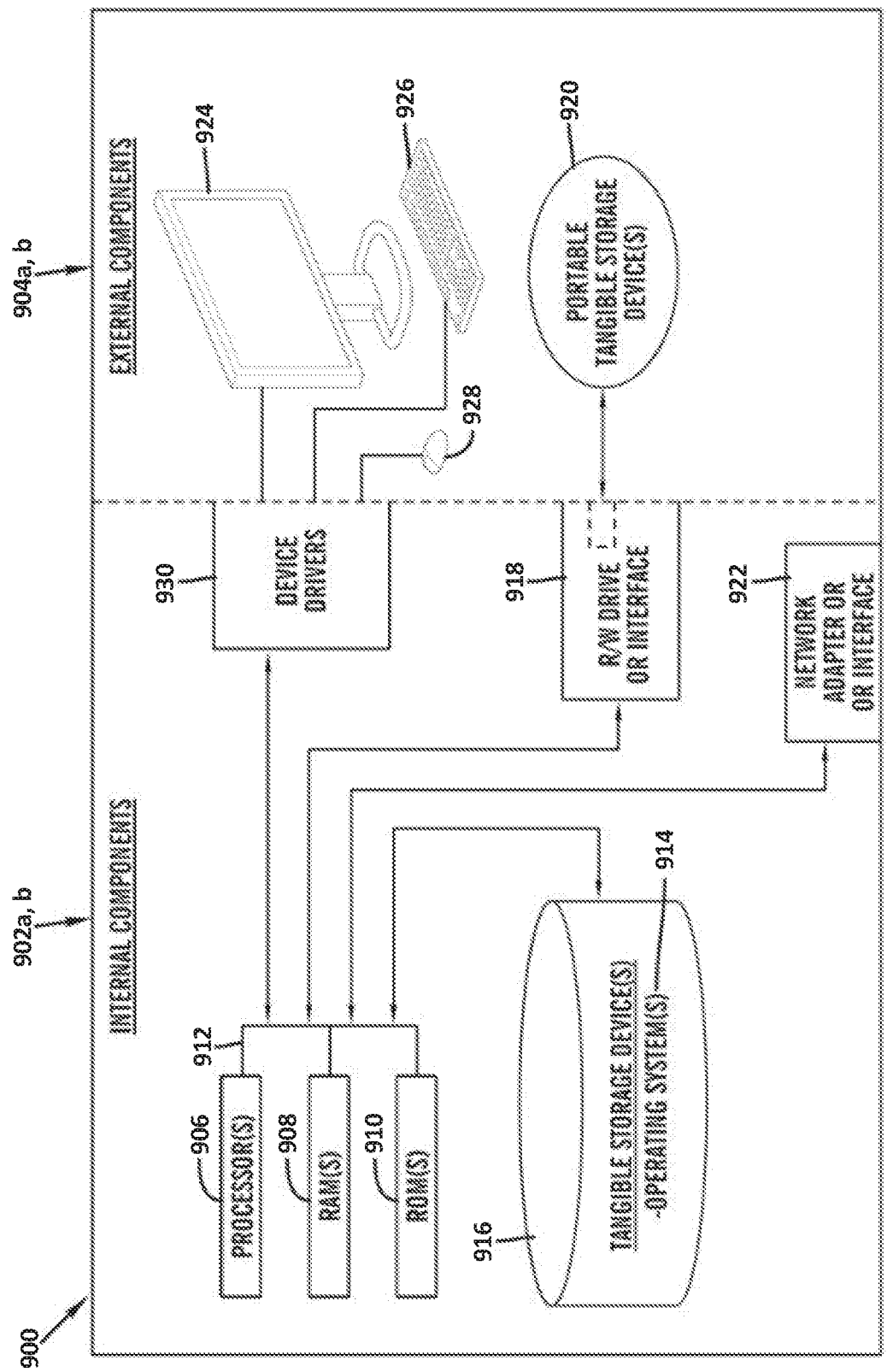
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the in-vehicle environmental conditions adjustment program 110a in client computer 102, and the in-vehicle environmental conditions adjustment program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semi-conductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the in-vehicle environmental conditions adjustment program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the in-vehicle environmental conditions adjustment program 110a in client computer 102 and the in-vehicle environmental conditions adjustment program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the in-vehicle environmental conditions adjustment program 110a in client computer 102 and the in-vehicle environmental conditions adjustment program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
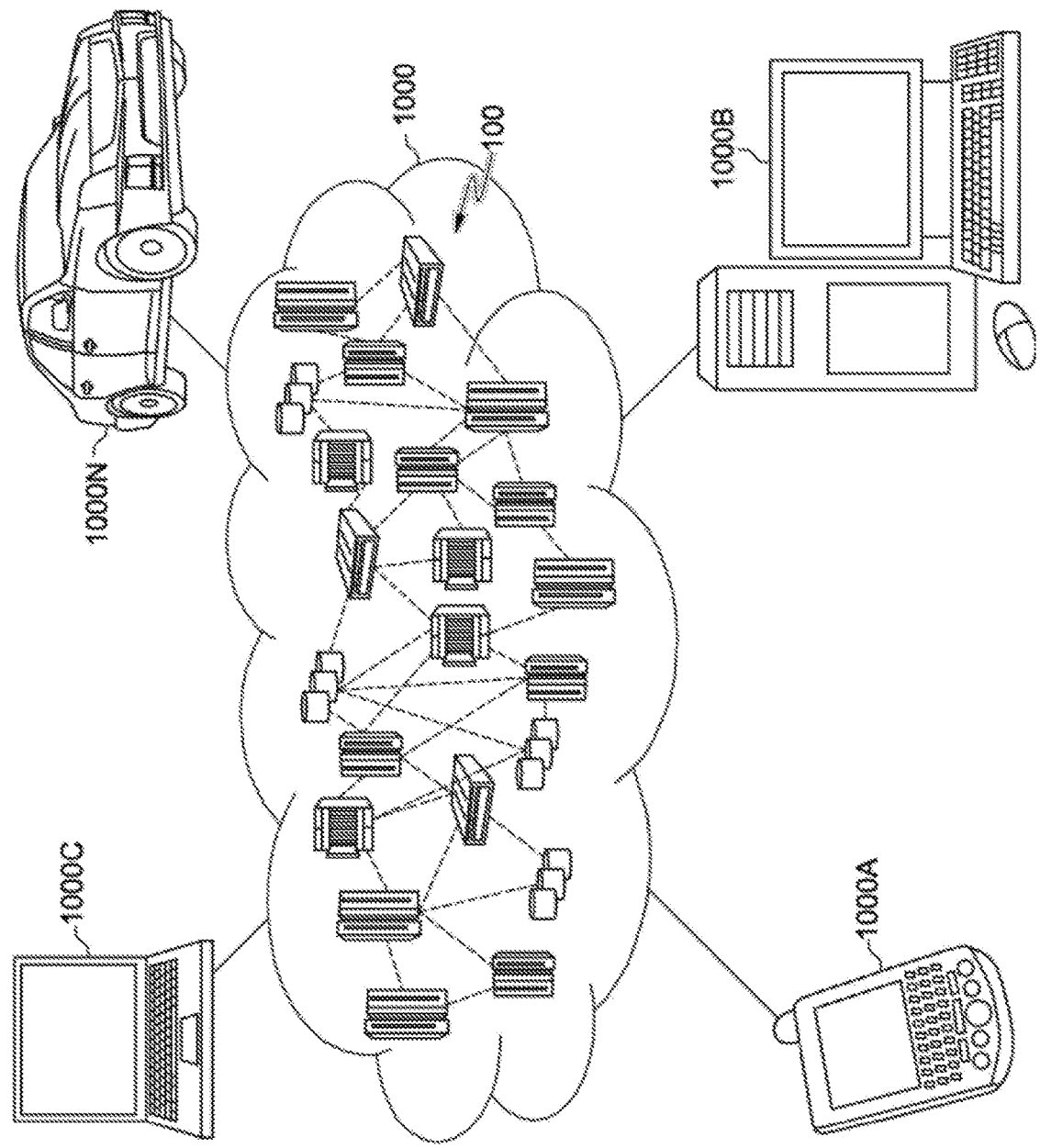
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and in-vehicle environmental conditions adjustment 1156. An in-vehicle environmental conditions adjustment program 110*a*, 110*b* provides a way to adjust in-vehicle environmental conditions based on external environmental conditions at the expected destination of the vehicle.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   monitoring a plurality of environmental conditions of a vehicle by utilizing at least one vehicle device sensor, wherein a level of comfort level associated with each of one or more vehicle occupants in the vehicle is determined;
   retrieving a plurality of environmental conditions of an expected destination of the vehicle, wherein the retrieved plurality of environmental conditions of the expected destination of the vehicle is based on an estimated time of arrival at the expected destination and an estimated travel time for the vehicle to arrive at the expected destination;
   determining a delta between the monitored plurality of environmental conditions of the vehicle and the retrieved plurality of environmental conditions of the expected destination of the vehicle;
   calculating a threshold for adjusting the monitored plurality of environmental conditions of the vehicle and at the expected destination of the vehicle based on the determined level of comfort associated with each of the one or more vehicle occupants; and
   incrementally adjusting the monitored plurality of environmental conditions of the vehicle over an evenly distributed length of time to reach the retrieved plurality of environmental conditions of the expected destination based on the estimated travel time of the vehicle to the expected destination and the calculated threshold, wherein the incremental adjusting consistently reduces the delta over a plurality of time periods throughout the estimated travel time such that the delta is zero when the vehicle arrives at the expected destination, wherein each of the monitored plurality of environmental conditions are incrementally adjusted according to different adjustment factors.

2. The computer-implemented method of claim 1, wherein the monitored plurality of environmental conditions of the vehicle include temperature, humidity and air pressure, and wherein the retrieved plurality of environmental conditions of the expected destination of the vehicle include destination temperature, destination humidity, and destination air pressure.

3. The computer-implemented method of claim 1, further comprising:
   determining one or more vehicle occupants associated with a wearable device or a mobile device;
   continuously collecting real-time data associated with a plurality of biometric readings for each vehicle occupant with the wearable device or the mobile device by utilizing at least one biometric sensor associated with the wearable device or the mobile device; and
   determining a level of comfort for each of the one or more vehicle occupants associated with the wearable or the mobile device based on the plurality of biometric readings.

4. The computer-implemented method of claim 3, further comprising:
   capturing an image of the one or more vehicle occupants by utilizing one or more in-vehicle cameras.

5. The computer-implemented method of claim 4, further comprising:
   identifying the one or more vehicle occupants by matching the image of the one or more vehicle occupants with a previously captured image of the one or more vehicle occupants; and
   retrieving, from a user database, a medical profile associated with the identified one or more vehicle occupants.

6. The computer-implemented method of claim 5, wherein the medical profile includes a name associated with each vehicle occupant, at least one user device associated with the each of the vehicle occupants, a set of medical data associated with each vehicle occupant, and a plurality of environmental condition preferences associated with each vehicle occupant.

7. The computer-implemented method of claim 4, further comprising:
   analyzing the captured image of the one or more vehicle occupants;
   identifying a type of clothing worn by each of the one or more vehicle occupants;
   generating a temporal profile for each vehicle occupant based on at least the type of clothing worn by each of the one or more vehicle occupants; and
   determining an activity the one or more vehicle occupants will engage in at the expected destination based on at least the temporal profile for each vehicle occupant.

8. The computer-implemented method of claim 7, further comprising:
   analyzing the temporal profile associated with each vehicle occupant, a medical profile associated with each identified vehicle occupant, and the plurality of biometric readings associated with each vehicle occupant with the wearable device or the mobile device;
   in response to determining the level of comfort for each vehicle occupant in the vehicle based on the temporal profile associated with each vehicle occupant, the medical profile associated with each identified vehicle occupant, and the analyzed plurality of biometric readings associated with each vehicle occupant with the wearable device or the mobile device is low, recalculating the adjusted plurality of environmental conditions in the vehicle to increase the level of comfort for each vehicle occupant; and
   continuously monitoring the determined level of comfort for each vehicle occupant, wherein the monitoring of the determined level of comfort for each vehicle occupant is halted by the at least one vehicle device sensor, wherein the at least one vehicle device sensor detects that the vehicle arrived at the expected destination and the vehicle is in a stationary state.

9. A computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
monitoring a plurality of environmental conditions of a vehicle by utilizing at least one vehicle device sensor, wherein a level of comfort level associated with each of one or more vehicle occupants in the vehicle is determined;
retrieving a plurality of environmental conditions of an expected destination of the vehicle, wherein the retrieved plurality of environmental conditions of the expected destination of the vehicle is based on an estimated time of arrival at the expected destination and an estimated travel time for the vehicle to arrive at the expected destination;
determining a delta between the monitored plurality of environmental conditions of the vehicle and the retrieved plurality of environmental conditions of the expected destination of the vehicle;
calculating a threshold for adjusting the monitored plurality of environmental conditions of the vehicle and at the expected destination of the vehicle based on the determined level of comfort associated with each of the one or more vehicle occupants; and
incrementally adjusting the monitored plurality of environmental conditions of the vehicle over an evenly distributed length of time to reach the retrieved plurality of environmental conditions of the expected destination based on the estimated travel time of the vehicle to the expected destination and the calculated threshold, wherein the incremental adjusting consistently reduces the delta over a plurality of time periods throughout the estimated travel time such that the delta is zero when the vehicle arrives at the expected destination, wherein each of the monitored plurality of environmental conditions are incrementally adjusted according to different adjustment factors.

10. The computer system of claim 9, wherein the monitored plurality of environmental conditions of the vehicle include temperature, humidity and air pressure, and wherein the retrieved plurality of environmental conditions of the expected destination of the vehicle include destination temperature, destination humidity, and destination air pressure.

11. The computer system of claim 9, further comprising:
determining one or more vehicle occupants associated with a wearable device or a mobile device;
continuously collecting real-time data associated with a plurality of biometric readings for each vehicle occupant with the wearable device or the mobile device by utilizing at least one biometric sensor associated with the wearable device or the mobile device; and
determining a level of comfort for each of the one or more vehicle occupants associated with the wearable or the mobile device based on the plurality of biometric readings.

12. The computer system of claim 11, further comprising:
capturing an image of the one or more vehicle occupants by utilizing one or more in-vehicle cameras.

13. The computer system of claim 12, further comprising:
identifying the one or more vehicle occupants by matching the image of the one or more vehicle occupants with a previously captured image of the one or more vehicle occupants; and
retrieving, from a user database, a medical profile associated with the identified one or more vehicle occupants.

14. A computer program product comprising:
one or more computer-readable storage media and program instructions stored on at least one of the one or more tangible storage media, the program instructions executable by a processor to cause the processor to perform a method comprising:
monitoring a plurality of environmental conditions of a vehicle by utilizing at least one vehicle device sensor, wherein a level of comfort level associated with each of one or more vehicle occupants in the vehicle is determined;
retrieving a plurality of environmental conditions of an expected destination of the vehicle, wherein the retrieved plurality of environmental conditions of the expected destination of the vehicle is based on an estimated time of arrival at the expected destination and an estimated travel time for the vehicle to arrive at the expected destination;
determining a delta between the monitored plurality of environmental conditions of the vehicle and the retrieved plurality of environmental conditions of the expected destination of the vehicle;
calculating a threshold for adjusting the monitored plurality of environmental conditions of the vehicle and at the expected destination of the vehicle based on the determined level of comfort associated with each of the one or more vehicle occupants; and
incrementally adjusting the monitored plurality of environmental conditions of the vehicle over an evenly distributed length of time to reach the retrieved plurality of environmental conditions of the expected destination based on the estimated travel time of the vehicle to the expected destination and the calculated threshold, wherein the incremental adjusting consistently reduces the delta over a plurality of time periods throughout the estimated travel time such that the delta is zero when the vehicle arrives at the expected destination, wherein each of the monitored plurality of environmental conditions are incrementally adjusted according to different adjustment factors.

15. The computer program product of claim 14, wherein the monitored plurality of environmental conditions of the vehicle include temperature, humidity and air pressure, and wherein the retrieved plurality of environmental conditions of the expected destination of the vehicle include destination temperature, destination humidity, and destination air pressure.

16. The computer program product of claim 14, further comprising:
determining one or more vehicle occupants associated with a wearable device or a mobile device;
continuously collecting real-time data associated with a plurality of biometric readings for each vehicle occupant with the wearable device or the mobile device by utilizing at least one biometric sensor associated with the wearable device or the mobile device; and
determining a level of comfort for each of the one or more vehicle occupants associated with the wearable or the mobile device based on the plurality of biometric readings.

17. The computer program product of claim 16, further comprising:
 capturing an image of the one or more vehicle occupants by utilizing one or more in-vehicle cameras.

* * * * *